United States Patent

[11] 3,616,227

[72] Inventors Samuel C. Pan
  28 Beacon Hill Drive, Metuchen, N.J. 08840;
  Leonard J. Lerner, 105 Chester Circle, New Brunswick, N.J. 07052
[21] Appl. No. 798,217
[22] Filed Sept. 16, 1968
[23] Division of Ser. No. 631,854, Apr. 19, 1967, Pat. No. 3,451,995
[45] Patented Oct. 26, 1971

[54] SYNTHESIS OF STEROIDS
  4 Claims, No Drawings
[52] U.S. Cl. .................................................. 195/51, 195/32
[51] Int. Cl. ........................................... C07c 167/00
[50] Field of Search ....................................... 195/51, 32

[56] References Cited
UNITED STATES PATENTS
3,033,749 5/1962 Wettstein et al. ............. 260/210.5
3,102,080 8/1963 Raspe et al. .................. 195/51

Primary Examiner—Alvin E. Tanenholtz
Attorneys—Lawrence S. Levinson, Merle J. Smith and Theodore J. Criares ABSTRACT: This invention relates to α-glucosides of steroids containing hydroxy groups in both the 16α- and 17-positions and the method for preparing them by reacting with a polysaccharide or an oligosaccharide, such as maltose, in the presence of a source of the enzyme: amylase or transglucosylase. The α-glucosides are new compounds that possess estrogenic activity. They may be used, therefore, as antifertility agents.

SYNTHESIS OF STEROIDS

This application is a division of our application Ser. No. 631,854, filed Apr. 19, 1967 and now U.S. Pat. No. 3,451,995.

This invention relates to new compounds that are α-D-glucosides of steroids containing hydroxy groups in both the 16α- and 17-positions. The new compounds are prepared by interacting such steroids with a polysaccharide or an oligosaccharide in the presence of a source of the enzyme: amylase or transglucosylase.

Among the steroids that can be used to prepare the new compounds of this invention are any steroid containing hydroxy groups in both the 16α- and 17-positions. Such steroids include estriol ($\Delta^{1,3,5(10)}$-estratriene-3,16α,17β-triol), 16α-hydroxytestosterone, 16α-hydroxy-A-nortestosterone, 16α-hydroxy-19-nortestosterone, 17-epiestriol ($\Delta^{1,3,5(10)}$-estratriene-3,16α,17α-triol), or any of these parent compounds variously substituted at any position besides the 16α- and 17-positions, e.g., 9α-fluoro-11β,16α-dihydroxytestosterone.

These steroids are interacted with a polysaccharide or oligosaccharide such as sucrose, lactose, cellobiose, starch, dextrin and panose, and preferably maltose, in the presence of a source of the enzyme: amylase or transglucosylase. Sources of such enzyme include the purified enzyme itself, fungal amylase preparations such as those obtained by culturing such fungi as *Aspergillus niger* and *Aspergillus oryzae*, commercial sources of the enzyme, such as clarase (Takamine), and Rhozyme-S (Rohm and Haas), as well as amylase preparation obtained from any other known sources, such as microbial, animal and plant sources.

To prepare the new compounds of this invention, the steroid and polysaccharide (or oligosaccharide) are intermixed in the presence of the source of enzyme. This reaction is carried out in an aqueous medium preferably at a pH in the range of about 3.5 to about 6.5, and optimally about 4.5 to about 5.5, which may be maintained by a buffering system, such as McIlvaine's buffer (pH 5) at any normal temperature, such as a temperature in the range of about 20° to about 45° C., and optimally about 30° to about 37° C.

The reaction results in the preparation of the desired 16α-α-D-glucoside of the starting steroid. These glucosides are new compounds that possess estrogenic activity. Hence, they may be used in the same manner and for the same purposes as known estrogens, with the dose adjusted to reflect the activity of the particular compound. Specifically, the compounds of this invention can be used to inhibit ovulation in warm-blooded animals (mammals) such as rodents, dogs, cows and sheep by parenterally administrating 0.1 mg. to about 100 mg. daily. Also, they can be used as antifertility agents by accelerating ova transportation, inhibiting nidation or inducing resorption of the early fetus in mice, rats and rabbits in daily or single doses of 0.1 mg. to about 10 mg.

The following examples illustrate the invention (all temperatures being in centigrade):

EXAMPLE 1

16α-α-D-Glucoside of Estriol a. Preparation of the enzyme

*Aspergillus niger* NRRL 337 is grown on an agar slant of Czapek medium for 1 week at 25°. The spores are suspended in 5 ml. of 0.01 percent aqueous sodium lauryl sulfate solution and this suspension is used to inoculate ten 500 ml. Erlenmeyer flasks each containing 100 ml. of the following sterile medium:

| | |
|---|---|
| Corn meal | 20 g. |
| $(NH_4)_2SO_4$ | 2 g. |
| $KH_2PO_4$ | 1 g. |
| $MgSO_4 \cdot 7H_2O$ | 0.5 g. |
| $FeSO_4 \cdot 7H_2O$ | 0.01 g. |
| $CaCO_3$ | 5 g. |
| Water | 1 liter |

The flasks are incubated on a reciprocating shaker (100 cycles per minute and a 2-inch stroke) for 64 hours at 30°, when abundant mycelial growth appears. The culture is filtered and the filtrate containing amylase enzyme is used for the synthesis described in step (b).

b. Enzymic synthesis of estroil-16α-α-D-glucoside

To 500 ml. of the culture filtrate obtained in step (a) is added 10 g. of maltose which has been dissolved in 200 ml. of water and 100 ml. of pH 5.0 McIlvaine's buffer. Estriol (100 mg.) is dissolved in 100 ml. of a 50:50 acetone-water mixture and is also added. The reaction mixture is incubated at 30° for 16 hours when the formation of estriol glucoside can be demonstrated in the following manner.

One ml. of the reaction mixture is extracted three times with 2 ml. portions of ethyl acetate. The combined ethyl acetate extract is evaporated to dryness under vacuum and half of the evaporation residue after being dissolved in a 50:50 acetone-water mixture is chromatographed on an Eastman chromagram sheet with chloroform-methanol (8:1) as the developing solvent. The estriol glucoside moves as a spot at $R_f$=0.15 while the unconverted estriol moves at $R_f$=0.79. Both spots can be detected by their UV-absorption or their reaction with phosphomolylidic acid. On paper chromatograms, using ethyl acetate vs. water system, in which the paper is impregnated with water by dipping into a 1:3 water-acetone mixture and air-drying off the acetone, the estriol glucoside moves with $R_f$=0.35 and estriol moves at 0.95. Kieffer's ferric ferricyanide reagent can be used as the spray reagent.

c. Isolation and characterization of estriol-16α-α-D-glucoside

The 1 liter of the reaction mixture obtained in step (b) is shaken with 4 g. of active charcoal for 1 hour. After filtration and washing with a small volume of water, the charcoal is shaken 4 times, 30 minutes each time, with 40 ml. portions of a 50:50 acetone-water mixture, the charcoal being filtered off after each shaking. The combined aqueous acetone eluate, which now contains the estriol glucoside and the unconverted estriol is partitioned with benzene equal in volume to the aqueous acetone eluate. The partition is repeated with benzene which has been equilibrated with an equal volume of a 50:50 acetone-water mixture. Most of the unconverted estriol is now in the benzene phase while the estriol glucoside remains completely in the aqueous acetone phase.

The aqueous acetone phase is concentrated down under vacuum and chromatographed on a thin layer of Silica Gel GF, a 16×8 inches plate being used. The developing solvent consists of the upper phase of a mixture of ethyl acetate-n-butanol-water (4:1:1). The weakly UV-absorbing band at $R_f$=0.35 is eluted with a 50:50 acetone-water mixture. The eluate is extracted four times with portions of ethyl acetate equal in volume to the eluate. When the ethyl acetate phase is evaporated to dryness under vacuum, crystalline estriol glucoside is obtained. It is recrystallized several times from methanol-ethyl acetate to yield about 10 mg. of pure estriol-16α-α-D-glucoside, m.p. about 255°–257°; $[\alpha]_D^{23}$+143° (Methanol); $\lambda_{max}^{MeOH}$ 281μ($\epsilon$=2,190), 286μ ($\epsilon$=2,000); $\nu_{max}^{KBr}$ 3,485, 3,360, 1,604, 1,575, 1,498 cm.$^{-1}$; C 64.24 percent (calc'd. 64.00), H 7.70 percent (calc'd. 7.57); Solubility in water 0.13 mg. per ml.

The product has the formula

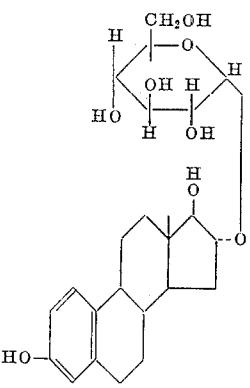

EXAMPLE 2

Following the procedure of example 1, but substituting 400 mg. of either of the following commercial fungal amylase preparations: clarase (Takamine) and Rhozyme-S (Rohm and Haas) for the culture filtrate in step (b) of the example, the name product is obtained.

EXAMPLE 3

16α-α-D-Glucoside of 16α-Hydroxytestosterone

Following the procedure of example 1 but substituting 100 mg. of 16α-hydroxytestosterone for the estriol in step (b), 16α-hydroxytestosterone-16α-α-D-glucoside is obtained.

EXAMPLE 4

Following the procedure of example 1 but substituting 10 g. of any of the following polysaccharides for the maltose in step (b) of the example, the same product is formed: starch, dextrin and panose.

EXAMPLE 5

16α-α-D-Glucoside of 16α-Hydroxy-A-nortestosterone

Following the procedure of example 1 but substituting 100 mg. of 16α-hydroxy-A-nortosterone for the estriol in step (b), 16α-hydroxy-A-nortestosterone-16α-α-D-glucoside is obtained.

EXAMPLE 6

16α-α-D-Glucoside of 16α-Hydroxy-19-nortestosterone

Following the procedure of example 1 but substituting 100 mg. of 16α-hydroxy-19-nortestosterone for the estriol in step (b), 16α-hydroxy-19-nortestosterone-16α-α-D-glucoside is obtained.

EXAMPLE 7

16α-α-D-Glucoside of 17-epiestriol

Following the procedure of example 1 but substituting 100 mg. of 17-espiestriol ($\Delta^{1,3,5(10)}$-estratriene-3,16α,17α-triol) for estriol in step (b), 17-epiestriol-16α-α-D-glucoside is obtained.

This invention may be variously otherwise embodied within the scope of the appended claims.

What is claimed is:

1. A process for preparing a 16α-α-D-glucoside of a steroid of the androstane series having hydroxy groups in the 16α- and 17-positions, which comprises interacting a polysaccharide or an oligosaccharide and a steroid of the androstane series having hydroxy groups in the 16α- and 17-positions in the presence of a source of the enzyme: amylase or transglucosylase.

2. The process of claim 1, wherein the polysaccharide is maltose.

3. The process of claim 2, wherein the steroid is estriol.

4. The process of claim 3 wherein the steroid is 16α-hydroxytestosterone.